US008910185B2

(12) United States Patent
Dixon et al.

(10) Patent No.: US 8,910,185 B2
(45) Date of Patent: Dec. 9, 2014

(54) MESSAGE QUEUING APPLICATION ACCESS TO SPECIFIC API SERVICES THROUGH A GENERIC API INTERFACE INTEGRATING A MESSAGE QUEUE

(75) Inventors: Bret W. Dixon, South Perth (AU); Scot Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 13/284,067

(22) Filed: Oct. 28, 2011

(65) Prior Publication Data

US 2013/0111500 A1 May 2, 2013

(51) Int. Cl.
G06F 3/00 (2006.01)
G06F 9/44 (2006.01)
G06F 9/46 (2006.01)
G06F 13/00 (2006.01)

(52) U.S. Cl.
CPC ........................................ G06F 9/44 (2013.01)
USPC ....................................................... 719/314

(58) Field of Classification Search
None
See application file for complete search history.

(56) References Cited

U.S. PATENT DOCUMENTS

| 5,916,307 | A * | 6/1999 | Piskiel et al. ................. 719/314 |
| 6,016,499 | A | 1/2000 | Ferguson |
| 6,226,689 | B1 * | 5/2001 | Shah et al. ..................... 719/314 |
| 7,370,335 | B1 | 5/2008 | White et al. |
| 7,853,612 | B2 | 12/2010 | Nelson et al. |
| 7,873,678 | B2 | 1/2011 | Tonev et al. |
| 8,130,924 | B2 | 3/2012 | Rossi et al. |
| 8,190,675 | B2 * | 5/2012 | Tribbett ........................ 709/203 |
| 2002/0152210 | A1 * | 10/2002 | Johnson et al. .................... 707/9 |
| 2006/0095332 | A1 * | 5/2006 | Riemann et al. ................ 705/22 |
| 2008/0288465 | A1 | 11/2008 | Payton et al. |
| 2009/0138891 | A1 | 5/2009 | Winig et al. |
| 2010/0228748 | A1 | 9/2010 | Dixon |
| 2010/0228766 | A1 | 9/2010 | Dixon |
| 2010/0306277 | A1 | 12/2010 | Rimer et al. |
| 2013/0111499 | A1 | 5/2013 | Dixon et al. |

OTHER PUBLICATIONS

U.S. Appl. No. 13/283,975, filed Oct. 28, 2011, Bret W. Dixon et al, 40 pages.
Final Office Action, mailing date Aug. 15, 2013, U.S. Appl. No. 13/283,975, filed Oct. 28, 2011, Bret W. Dixon et al.
Office Action, U.S. Appl. No. 13/283,975, filed 10-282-11, In re Dixon, mailing date Feb. 15, 2013.
Notice of Allowance, mailing date Jul. 30, 2014, U.S. Appl. No. 13/283,975, filed 10-282-11, In re Dixon.

* cited by examiner

*Primary Examiner* — Andy Ho
*Assistant Examiner* — William C Wood
(74) *Attorney, Agent, or Firm* — Diana R. Gerhardt; Amy J. Pattillo (57) ABSTRACT

An API bridge service retrieves a generic API message request, placed in a request queue of a message queuing network by a message queuing application, from the request queue. The API bridge service formats the generic API request into a particular API call for at least one specific API. The API bridge service calls at least one specific API with the particular API call. Responsive to the API bridge service receiving at least one API specific response from at least one specific API, the API bridge service translates at least one API specific response into a response message comprising a generic API response. The API bridge service, places the response message in a response queue of the message queuing network, wherein the message queuing application listens to the response queue for the response message.

19 Claims, 6 Drawing Sheets

MESSAGE QUEUING APPLICATION ACCESS TO SPECIFIC API SERVICES THROUGH A GENERIC API INTERFACE INTEGRATING A MESSAGE QUEUE

1. TECHNICAL FIELD

The embodiment of the invention relates generally to data processing systems and particularly to message queuing application access to specific API services through a generic API interface integrating a message queue, wherein the message queuing application receives specific API services without the message queuing application calling the specific API.

2. DESCRIPTION OF THE RELATED ART

In one example, an application programming interface (API) is a particular set of routines, protocols, code, and other specifications that supports requests for services of an application or system and provides an interface through which different applications and system can communicate with one another. Many different APIs exist, each with different specifications and degrees of complexity. Given the differences between APIs, programmers exploiting APIs often must gain new skills and understanding to exploit the unique specifications of each particular API.

In addition, while APIs provide an interface through which applications can communicate with one another that may expand the functionality of an application calling the API, when an application is programmed to call a particular API, the functionality of the application is bound to the API. An application bound to an API requires maintenance and updates whenever the API is updated. In addition, the performance of an application bound to an API is affected by changes to the location and availability of servers hosting the API.

Message queuing applications may regularly call a message queue API to store and retrieve data from a message queue. Message queuing applications may also require access to other services that are implemented using specific APIs other than the message queue API, where including code within the message queuing application to call the specific APIs increases the complexity and skill level required for program development and maintenance of the message queuing application.

BRIEF SUMMARY

In view of the foregoing, there is a need for a method, system, and program product for a message queuing application to access specific API services through a generic API interface integrating a message queue interface, such that message queuing applications are able to access specific API services without calling a specific API.

In one embodiment of the invention, a method, system, and computer program product for managing message queuing application access to a specific API service, without the message queuing application calling a specific API, include an API bridge service listening to a request queue of a message queuing network.

In one embodiment, a method for a message queuing application to access a specific application programming interface (API) service is directed, responsive to an API bridge service detecting a request message placed in a request queue of a message queuingnetwork by a message queuing application, to retrieving, by the API bridge service, the request message from the request queue, wherein the request message comprises a generic API message request, wherein the generic API message request comprises an API service request in a message queue format independent of any specific API specification. The method is directed to formatting, by the API bridge service, the generic API message request in the request message into a particular API call for at least one specific API. The method is directed to calling, by the API bridge service, the at least one specific API with the particular API call. The method is directed, responsive to the API bridge service receiving at least one API specific response from the at least one specific API, to formatting, by the API bridge service, the at least one API specific response into a response message comprising a generic API response. The method is directed to placing, by the API bridge service, the response message in a response queue of the message queuing network, wherein the message queuing application listens to the response queue for the response message and retrieves the response message to receive a specific API service from the at least one specific API without calling the at least one specific API.

In another embodiment, system for a message queuing application to access a specific application programming interface (API) service comprises an API bridge service, comprising least one processor and a memory, responsive to an API bridge service detecting a request message placed in a request queue of a message queuing network by a message queuing application, operative to retrieve, the request message from the request queue, wherein the request message comprises a generic API message request, wherein the generic API message request comprises an API service request in a message queue format independent of any specific API specification. The system comprises the API bridge service operative to format the generic API message request in the request message into a particular API call for at least one specific API. The system comprises the API bridge service operative to call the at least one specific API with the particular API call. The system comprises the API bridge service, responsive to the API bridge service receiving at least one API specific response from at least one specific API, operative to translate the at least one API specific response into a response message comprising a generic API response. The system comprises the API bridge service operative to place the response message in a response queue of the message queuing network, wherein the message queuing application listens to the response queue for the response message and retrieves the response message to receive a specific API service from the at least one specific API without calling the at least one specific API.

In another embodiment, a computer program product for a message queuing application to access a specific application programming interface (API) service comprises one or more computer-readable, tangible storage devices. The computer program product comprises program instructions, stored on at least one of the one or more storage devices, responsive to an API bridge service detecting a request message placed in a request queue of a message queuing network by a message queuing application, to retrieve, by the API bridge service, the request message from the request queue, wherein the request message comprises a generic API message request, wherein the generic API message request comprises an API service request in a message queue format independent of any specific API specification. The computer program product comprises program instructions, stored on at least one of the one or more storage devices to format, by the API bridge service, the generic API message request in the request message into a particular API call for at least one specific API. The computer program product comprises program instructions, stored on at least one of the one or more storage device to call, by the API bridge service, the at least one specific API with the particular API call. The computer program product comprises program instructions, stored on at least one of the one or more storage devices, responsive to the API bridge service receiving at least one API specific response from the at least one specific API, to translate, by the API bridge service, the at least one API specific response into a response message comprising a generic API response. The computer program product comprises program instructions, stored on at least one of the one or more storage devices, to place, by the API bridge service, the response message in a response queue of the message queuing network, wherein the message queuing application listens to the response queue for the response message and retrieves the response message to receive a specific API service from the at least one specific API without calling the at least one specific API.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
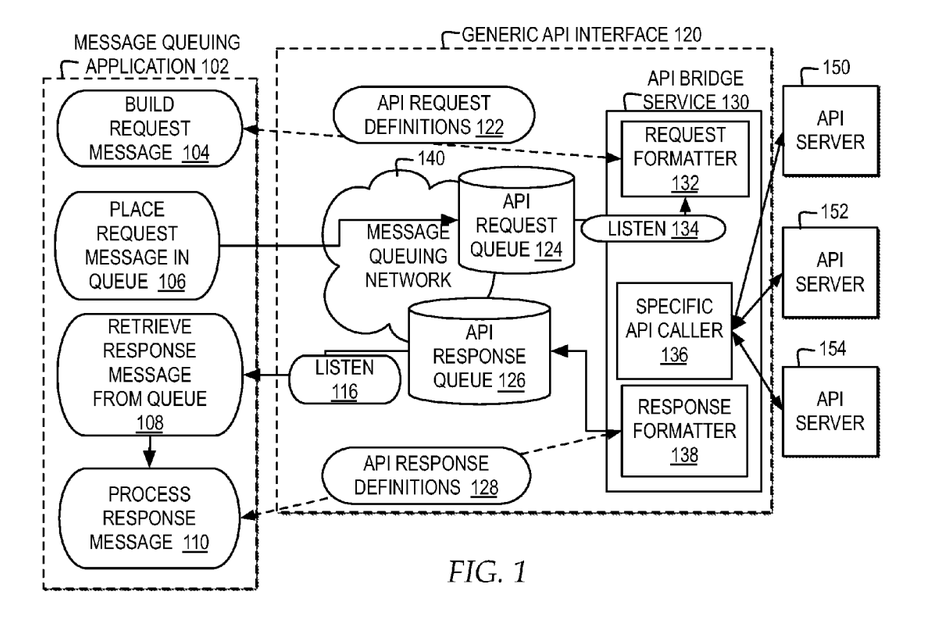
FIG. 1 illustrates a block diagram of a generic API interface with message queuing for managing access by a message queuing application to specific API services through generic API requests placed by the message queuing application in a message queue of the generic API interface.

FIG. 1 illustrates a block diagram of a generic API interface with message queuing for managing access by a message queuing application to specific API services through generic API requests placed by the message queuing application in a message queue of the generic API interface.

As illustrated, a message queuing application 102 communicates with a generic API interface 120. In particular, generic API interface 120 provides an interface through which message queuing application 120 has access to one or more message queues integrated within generic API interface 120. In the example, generic API interface 120 includes a message queuing network 140. A queue manager and message queue APIs of message queuing network 140, in general, are called by message queuing application 102 to handle storage and retrieval of data in the form of messages on message queues of message queuing network 140 using a message queue API. The queue manager manages the storage and retrieval of the messages data from the message queues. While message queuing network 140 is illustrated as representing a message queue system with one or more message queues positioned on one or more systems communicatively connected through a network and the associated management services and queue APIs, in other embodiments, generic API interface 120 may implement additional or alternate types of message queuing networks or message queuing systems.

In the example, generic API interface 120 allows for message queuing application 102 to access specific API services implemented using specific APIs without message queuing application 102 calling the specific API. For example, API servers 150, 152, and 154 host specific API services provided by calling specific APIs. Generic API interface 120 provides an interface through which message queuing application 102 may access other specific API services without message queuing application 102 needing to call or bind to a specific API to access the specific API services. In one example, one or more of API servers 150, 152, and 154 may host an API service for a security system that provides security profiles, such as Resource Access Control Facility (RACF®), wherein message queuing application 102 passes requests for security profiles from RACF through messages placed on generic API interface 120, rather than by directly calling or binding to the specific API for the RACF. While in the example API servers 150, 152, and 154 are illustrated as hosting specific API services provided by calling specific APIs, in additional or alternate embodiments, additional or alternate servers may provide specific API services called through specific APIs and in additional or alternate embodiments, specific API services provided by calling specific APIs may be hosted by other types of systems, from services such as a cloud service, or from distributed environment systems.

In the example, to facilitate message queuing application 102 access to specific API services provided through specific APIs without message queuing application 102 calling a specific API, generic API interface 120 includes at least one queue for request messages, illustrated as API request queue 124, and at least one queue for reply messages, illustrated as API response queue 126, within a message queuing network 140. Message queuing application 102 may represent an application, service, or other component that at least builds messages for placement in API request queue 124 and processes messages read from API response queue 126. In addition, message queuing application 102 may perform additional functions for interfacing with message queuing network 140 and message queuing application 102 may be called by other applications. In one embodiment, the IBM® Information Management System (IMS™), the IBM® Customer Information Control System (CICS®), and the IBM® Websphere® Application Server (WAS) products are examples of systems that support message queuing, including support for message queuing network 140, or provide components that use message queuing, such as message queuing application 102. In one example, message queuing is used extensively by customer-developed applications which conform to their own application naming conventions.

Each of API request queue 124 and API response queue 126 may represent named destinations to which messages can be sent and from which messages can be retrieved within one or more systems accessible within message queuing network 140. Message queuing network 140 may include one or more systems communicatively connected via one or more networks and providing message queuing services through a queue manager, including message queue APIs and other queue management services. Generic API interface 120 may include additional or alternate queues within message queuing network 140 and may include additional or alternate message queuing networks.

As illustrated at reference numeral 104, when message queuing application 102 requires access to any specific API services, message queuing application 102 builds a request message to place in API request queue 124, allowing a request for specific API service without calling a specific API. In the example, message queuing application 102 may build request messages conforming to API request definitions 122 specified for generic API interface 120. In particular, in building request messages conforming to API request definitions 122, message queuing application 102 builds structured data messages for generic API requests, where a generic API request represents an API service request in a message queue format independent of any specific API specification. In one example, API request definitions 122 and API response definitions 128 may specify structured data messages in a structured data language such as Extensible Markup Language (XML) or may specify structured data messages in a simple delimited string format. In another example, API request definitions 122 and API response definitions 128 may specify structured data messages in an IBM® WebSphere® MQ Programmable Control Format (PCF) or equivalent message structure.

In addition, message queuing application 102, as illustrated at reference numeral 106 requests placement of the request message in API request queue 124 of generic API interface 120 to be read by API bridge service 130 of generic API interface 120. In the example, message queuing application 102 may call a message queue API of message queuing network 140 to handle locating API request queue 124 within message queuing network 140 and to handle placing the request message on API request queue 124. In addition, message queuing application 102 may call the message queue API of message queuing network 140 to listen for API response messages placed in API response queue 126, illustrated at reference numeral 116.

In the example, API bridge service 130 is another layer of generic API interface 120. API bridge service 130 listens for structured data request messages on API request queue 124 and reads new structured data request messages placed in API request queue 124. In one example, API bridge service 130 may call the message queue API of message queuing network 140 to listen for API request messages placed in API request queue 124 and read the messages from API request queue 124, illustrated at reference numeral 134. In one example, API bridge service 130 is a service that can be started and stopped as required. While the example is illustrated with API bridge service 130 listening to API request queue 124, illustrated at reference numeral 134, API bridge service 130 may also monitor additional API request queues within message queuing network 140 or additional API request queues within other message queuing networks.

As illustrated, a request formatter 132 of API bridge service 130 validates the new structured data request message read by listener 134 based on the specifications in API request definitions 122 and translates the new structured data request message into at least one specific API call. A specific API caller 136 of API bridge service 130 manages calling a specific API on at least one API server 150, 152, and 154 with the specific API call. In particular, in the example, while message queuing application 102 generates API-independent, generic API requests for specific API services, request formatter 132 generates specific API calls for specific API services and specific API caller 136 calls and binds to specific APIs.

As illustrated, API servers 150, 152, and 154 receive specific API calls by specific API caller 136 of API bridge service 130 to call one or more specific API services. The API services receiving specific API calls at API servers 150, 152, and 154 each process the specific API calls and return API specific responses to API bridge service 130. While API servers 150, 152, and 154 are illustrated in the example, in other embodiments, specific API caller 136 may call specific API services on additional or alternate servers.

A response formatter 138 of API bridge service 130 receives API specific responses from API servers 150, 152, and 154, validates the API specific responses and translates the API specific responses into response messages with generic API responses, based on specifications in API response definitions 128. In one example, response formatter 138 translates API specific responses into structured data message responses based on API response definitions 128.

In the example, when an API called by specific API caller 136 is updated or the location of an API called from one or more of API servers 150, 152, or 154 is updated, specific API caller 136 receives the updates and modifies request formatter 132 to reflect the updates. By updating API bridge service 130 when APIs called by API bridge service 130 are updated, message queuing application 102 may access updated API services for updated APIs, but since there are not references to the specific APIs in message queuing application 102, message queuing application 102 does not need to be updated for each update of an API.

Response formatter 138 places structured data message responses in API response queue 126 of generic API interface 120. In addition, if request formatter 132 or response formatter 138 are not able to validate the request message or response message or other errors are detected by API bridge service 130, API bridge service 130 places error messages in API response queue 126 to return to the requesting message queuing application. In addition, message queue network 140 detects error messages and may provide error message handling services.

In the example, message queuing application 102 listens to API response queue 126 and retrieves response messages from API response queue 126, as illustrated at reference numeral 108. In the example, message queuing application 102 may listen to API response queue 126 until a response to the request is received through a message queue API of message queuing network 140 by message queuing application 102, as illustrated at reference numeral 116. As illustrated at reference numeral 110, message queuing application 102 processes response messages retrieved from API response queue 126 in accordance with API response definitions 128.

In one example, message queuing application 102 may build a structured data generic API request message, as illustrated at reference numeral 104, according to API request definitions 122, in an XML format such as:

```
<APIRequest>
    <APIRHeader>
        <APIRFunction>value</APIRFunction>
        <APIRParmCount>value</APIRParmCount>
    </APIRHeader>
    <APIRBody>
        <APIRParameter>
            <APIRParmName>value</APIRParmName>
            <APIRParmType>value</APIRParmType>
            <APIRParmValue>value</APIRParmValue>
        </APIRParameter>
    </APIRBody>
</APIRequest>
```

In the example, message queuing application 102 may call a message queue API of message queuing network 140 to connect to a message queue manager, such as by calling MQCONN, and call a message queue API of message queuing network 140 to place the generic API request in API request queue 124, such as by calling MQPUT(APIRequest), where message queuing network 140 includes a messaging service provided by Websphere MQSeries®. Request formatter 132 may call a message queue API of message queuing network 140 to listen to API request queue 124, call a message queue API such as MQGET(APIRequest) to retrieve the request message, and formats the APIRequest message into an API call for a specific API. Specific API caller 136 calls a specific API server for the particular API call. Response formatter 138 formats a response from the specific API server into a structured data generic API response message, according to API response definitions 128, in an XML format such as:

```
<APIReply>
    <APIRHeader>
        <APIRFunction>value</APIRFunction>
        <APIRParmCount>value</APIRParmCount>
    </APIRHeader>
    <APIRBody>
        <APIRParameter>
            <APIRParmName>value</APIRParmName>
            <APIRParmType>value</APIRParmType>
            <APIRParmValue>value</APIRParmValue>
        </APIRParameter>
    </APIRBody>
    <APIRResult>
        <APIRCompletion>
            <APIRParmType>value</APIRParmType>
            <APIRParmValue>value</APIRParmValue>
        </APIRCompletion>
        <APIRReason>
            <APIRParmType>value</APIRParmType>
            <APIRParmValue>value</APIRParmValue>
        </APIRReason>
    </APIRResult>
</APIReply>
```

Response formatter 138 may call a message queue API of message queuing network 140 to place the generic API response in API response queue 126, such as by calling MQPUT(APIReply). Message queuing application 102 listens to API response queue 126 and calls the message queue API of message queuing network 140 to retrieve the generic API response message from API response queue 126, such as by calling MQGET(APIReply).

The response message retrieved by message queuing application 102 from API response queue 126 of generic API interface 120 and processed by message queuing application 102 provides message queuing application 102 with a specific API service through generic API interface 120, without message queuing application 102 referencing the specific API, without message queuing application 102 establishing direct connections with the specific API service, and without message queuing application 120 calling the specific API providing the specific API service. By message queuing application 102 accessing specific API services through generic API interface 120, message queuing application 102 is isolated from changes to APIs and changes to the location and availability of API servers. In particular, in the example, by message queuing application 102 requesting placement of request messages in API request queue 124, which is listened to by API bridge service 130, and message queuing application 102 retrieving response messages from API response queue 126, placed by API bridge service 130, message queuing application 102 communicates with API bridge service 130 without there being connection-oriented communication session or any physical connection between message queuing application 102 and API bridge service 130 or with any of the API servers 150, 152, and 154 providing the specific API services. API servers 150, 152, and 154 may provide API services to message queuing application 102, without any connection between message queuing application 102 and API servers 150, 152, and 154, based on API specific calls by API bridge service 130. In the example, there may be connection-oriented communication sessions or physical connections between API bridge service 130 and API servers 150, 152, and 154, or API bridge service 130 and API servers 150, 152, and 154 may indirectly communicate through another layer of message queues implemented between API bridge service 130 and API servers 150, 152, and 154.

In the example, generic API interface 120 provides a time-independent, asynchronous API interface to message queuing applications, including the characteristics of message queue systems, through which message queuing application 102 can invoke specific API services through messages, such that to access specific API services, message queuing application 102 is not required to maintain complex coding for specific APIs or dependency on API bindings within the code of message queuing application 102. For example, one characteristic of message queue systems is a time-independent communication interface. In the example, message queuing application 102 can request an API service by placing a request message on API request queue 124 of generic API interface 120 and then continue to perform other work until API bridge service 130 returns a response message from the API called by API bridge service 130. In another example, other characteristics of message queue systems include, but are not limited to, guaranteed delivery of a request message and delivery of a response message, error handling, message security, data integrity services, and data recovery support services. In the example, message queuing network 140 of generic API interface 120 may include message queue services to guarantee delivery of the request message and delivery of a response message, handle errors, secure communications, maintain data integrity, and manage data recovery.

In contrast to the example illustrated in FIG. 1, if message queuing application 102 does not request specific API services through generic API requests submitted to generic API interface 120, one alternative for message queuing application 102 invoking API services would require calls by message queuing application 102 to specific APIs, requiring more complex, specific API service calls and dependency on API bindings coded into message queuing application 102 and calling a specific API would include, but is not limited to, identifying the current location of the API service, waiting for availability to connect with the API service at the current location, establishing a secure connection with the API service at the current location, maintaining the connection with the API service until a response is returned, handling any errors returned by the API service, and handling data recovery for lost communications.

In the example in FIG. 1, message queuing application 102 and one or more components of generic API interface 120 may be implemented within a same system or distributed across multiple systems. In addition, in the example in FIG. 1, communication connections illustrated between message queuing application 102, components of generic API interface 120, and API servers 150, 152, and 154 may represent communicative connections within a system or across a network.

Figure 2:
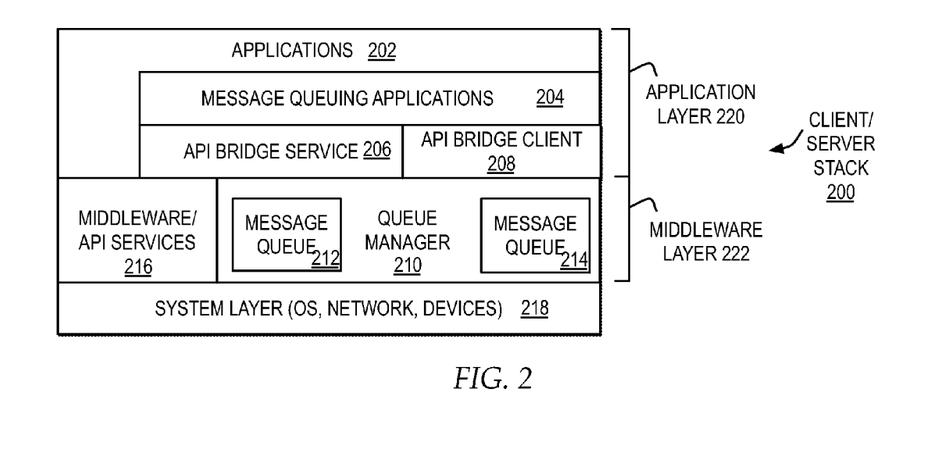
FIG. 2 illustrates a block diagram of one example of a system layer diagram for a client and server implementation of a message queuing application and generic API interface running on a same system.

FIG. 2 illustrates a block diagram of one example of a system layer diagram for a client and server implementation of a message queuing application and generic API interface running on a same system. In the example, a client/server stack 200 includes multiple layers, including an application layer 220, a middleware layer 222, and a system layer 218, which may include one or more of one or more operating system (OS) layers, one or more network layers, and one or more devices and device layers.

In the example, application layer 220 may include applications 202, message queuing applications 204, an API bridge service 206, and an API bridge client 208. In addition, in the example, middleware layer 222 may include middleware and API services 216, queue manager 210, and message queues 212 and 214. In one example, API bridge client 208 of message queuing applications 204 includes message queuing application 102, API bridge service 206 includes API bridge service 130, queue manager 210 includes a queue manager implemented within message queuing network 140, message queue 212 includes API request queue 124, message queue 214 includes API response queue 126, and middleware and API services 216 includes one or more of the API services called from API server 150, API server 152, and API server 154. In the example, API bridge client 208 includes at least one message queuing application of message queuing applications 204 that access and use generic API interface 120.

Queue manager 210 may include management services for managing reliable message queuing in message queues 212 and 214, allowing messages to be queued and accessed asynchronously by applications when active, allowing multiple providers to place messages in and access messages from message queues 212 and 214, ensuring that queued messages are delivery exactly once, ensuring data security of message placements and accesses, and handling errors. In addition, queue manager 210 may include one or more message queue APIs which may include, but are not limited to, specifications for at least one routine, data structure, data class, or protocol, a description of a set of class definitions with a set of behaviors associated with those classes, one or more language bindings, and a defined set of Hypertext Transfer Protocol (HTTP) or Extensible Markup Language (XML) request messages and a definition of the structure of response messages. In the example, API request definitions 122 and API request definitions 128 may be distributed within one or more of message queuing applications 204, queue manager 210, and API bridge service 206 for specifying the structure and other specifications of generic API request messages and generic API response messages.

In one example, API bridge service 206, queue manager 210 and message queues 212 and 214 represent layers within generic API interface 120, implemented within a system running both a client and server implementation of message queuing applications 204. In the example, API bridge client 208, which includes at least one of message queuing applications 204 which use generic API interface 120, may call queue manager 210 for placing API request messages on message queue 212, for requesting to listen to message queue 214, and for retrieving messages from message queue 214. Asynchronously, API bridge service 206 calls queue manager 210 to read API request messages from message queue 212. API bridge service 206 validates API request messages read from message queue 212. API bridge service 206 translates API request messages into specific API calls and API bridge service 206 calls the specific API, such as by calling a specific API within middleware and API services 216. API bridge service 206 receives an API specific response from the called API, translates the API specific response into a structured data response message according to API response definitions 128, and places the structured data response message in message queue 214. API bridge client 208 listens to message queue 214 through queue manager 210 and reads structured data response messages from message queue 214, where the requesting message queuing application then processes the structured data response message, which provides message queuing applications 204 with a specific API service without message queuing applications 204 invoking a specific API or connecting with the specific API.

In the example, API bridge service 206 and API bridge client 208 are functional layers added to application layer 220 to integrate the functionality of an API with the functionality of queue manager 210, message queue 212, and message queue 214, for message queuing applications 204. By integrating the functionality of an API with the functionality of queue manager 210, message queue 212, and message queue 214 for API bridge client 208, message queuing applications 204 that use generic API interface 120 may access specific API services without having to generate and bind to specific API calls.

In another example, applications 202 and message queuing applications 204 are illustrated as specifically referencing middleware and API services 216 and directly connecting with middleware and API services 216, rather than communicating with middleware and API services 216 through API bridge client 208 and API bridge service 206. In the example where applications 202 or message queuing applications 204 directly connect with middleware and API services 216, applications 202 or message queuing applications 204 are required to maintain code to generate a specific API call for a specific API, to connect with the specific API, to wait for a response from the specific API, and to handle any errors, data loss issues, and security issues during the connection with the API call.

Figure 3:
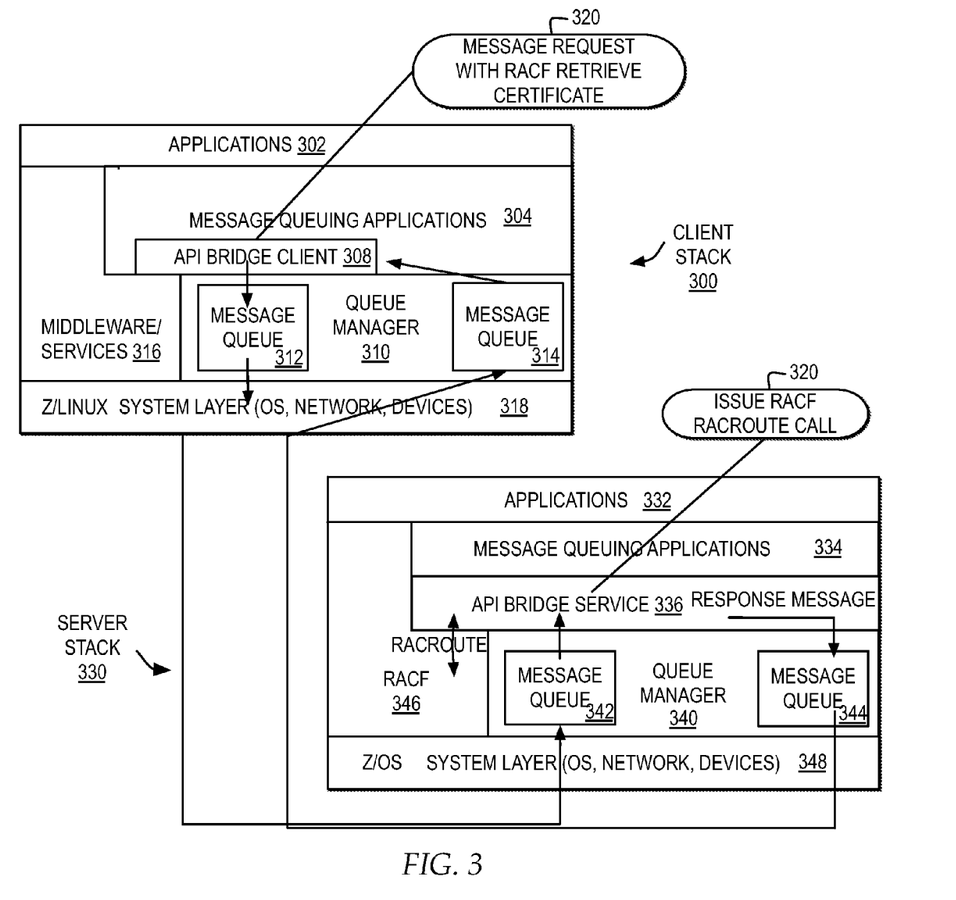
FIG. 3 illustrates a block diagram of one example of a system layer diagram for implementing each of a client and server for a message queuing application and generic API interface distributed across different systems.

FIG. 3 illustrates a block diagram of one example of a system layer diagram for implementing each of a client and server for a generic API interface distributed across different systems. In the example in FIG. 3, a client stack 300 includes multiple layers, including an application layer 320, a middleware layer 322, and a system layer 318, which may include one or more of one or more operating system (OS) layers, one or more network layers, and one or more devices and device layers. In addition, a server stack 330 includes multiple layer, including an application layer 350, a middleware layer 352 and a system layer 348. A client system implementing client stack 300 is operatively connected to a server system implementing server stack 330.

In the example, client stack 300 represents the client implementation of message queuing applications and generic API interface 120. Application layer 320 of client stack 300 may include applications 302, message queuing applications 304, and an API bridge client 308, where API bridge client 308 includes message queuing applications that use generic API interface 120. In addition, in the example, middleware layer 322 of client system 300 may include middleware and API services 316, queue manager 310, and message queues 212 and 214.

In addition, in the example, server stack 330 represents the server implementation of message queuing applications and generic API interface 120. Application layer 350 of server stack 330 may include applications 332, message queuing applications 334, an API bridge service 336, and an API bridge client 338. In addition, in the example, middleware layer 352 of server stack 330 may include middleware and API services 346, queue manager 340, message queue 342, and message queue 344.

In one example, message queuing application 102 may be distributed across one or more of message queuing applications 304, within API bridge client 308, and message queuing applications 334. In addition, generic API interface 120 may be distributed across API bridge service 336, queue manager 310, message queue 312, message queue 314, queue manager 340, message queue 342, and message queue 344.

In the example, API bridge client 308 is a functional layer added to client message queuing applications 304 that use generic API interface 120 and API bridge service 336 is a functional layer added to server message queuing applications 334 to integrate the functionality of an API with the functionality of message queuing at the client through queue manager 310, message queue 312, and message queue 314 and at the server through queue manager 340, message queue 342, and message queue 344.

In particular, in the example, system layer 318 is running a z/Linux operating system and system layer 348 is running a z/OS operating system. A distributed message queuing application that uses generic API interface 120, illustrated by API bridge client 308, is running on the z/Linux operating system illustrated by client stack 300. API bridge client 308 needs to access security profiles from a security manager running on a z/OS operating system, such as RACF 346, as illustrated by server stack 330. In the example, the distributed message queuing application of API bridge client 308 creates a message request conforming to API request definitions 122 with a RACF request for a certificate, as illustrated at reference numeral 320, and places the request message in message queue 312. Messages placed in message queue 312 are passed to message queue 342, the remote representation of message queue 312. API bridge service 336 on server stack 330 listens to message queue 342 and reads new messages from message queue 342. API bridge services 336 formats the request message into a specific RACF RACROUTE call, where RACROUTE is the API to RACF, an external security manager, and API bridge service 336 issues the RACROUTE call, as illustrated at reference numeral 320, to RACF 346. RACF 346 receives the RACROUTE call and handles the RACROUTE request and returns a result to API bridge service 336. In the example, API bridge service 336 formats the result returned from the RACROUTE call into a response message according to API response definitions 128. API bridge service 336 places the response message in message queue 344. Messages placed in message queue 344 are passed to message queue 314, the remote representation of message queue 344. The distributed message queuing application, upon detecting a new response message on message queue 314, retrieves the response message from message queue 314 and processes the response message. The response message received by the distributed message queuing application provides the application with a RACF service through generic API bridge service 120, without the message queuing application having to build and issue a RACROUTE call to receive the RACF service.

Figure 4:
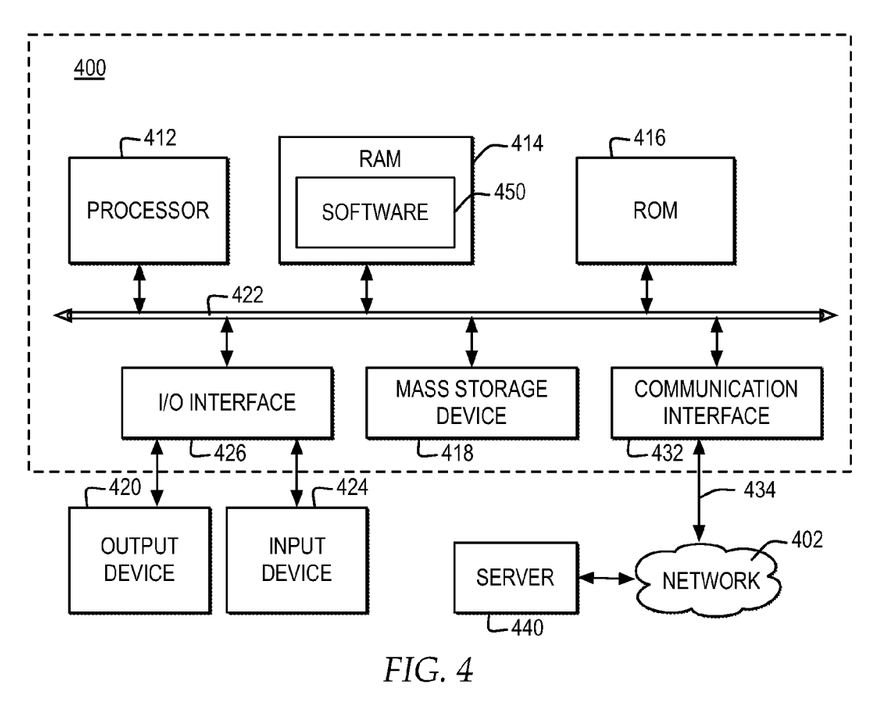
FIG. 4 illustrates one example of a computer system in which one embodiment of the invention may be implemented.

FIG. 4 illustrates one example of a computer system in which one embodiment of the invention may be implemented. The present invention may be performed in a variety of systems and combinations of systems, made up of functional components, such as the functional components described with reference to computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power. Where multiple processors share bus 422, additional controllers (not depicted) for managing bus access and locks may be implemented.

Processor 412 may be at least one general-purpose processor such as IBM® PowerPC® processor that, during normal operation, processes data under the control of software 450, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software 450 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 412 may control the operations of flowchart of FIGS. 5-8 and other operations described herein. Operations performed by processor 412 may be requested by software 450 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 418, a random access memory (RAM), such as RAM 414, a read-only memory (ROM) 416, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 400, partly on the user's computer, as a stand-alone software package, partly on the user's computer and partly on a remote computer or entirely on the remote computer or server, such as server 440. In the latter scenario, the remote computer may be connected to the user's computer through any type of network, such as network 402, through a communication interface, such as network interface 432, over a network link that may be connected, for example, to network 402.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 400, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 400, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 432, the network link to network 402, and network 402 may use electrical, electromagnetic, or optical signals that carry digital data streams. The signals through the various networks and the signals on network 402, the network link to network 402, and network interface 432 which carry the digital data to and from computer system 400, may be forms of carrier waves transporting the information.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

Figure 5:
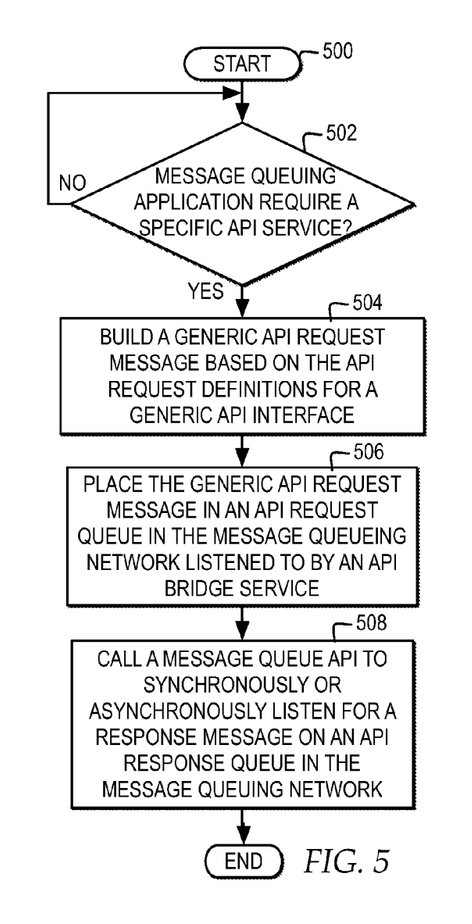
FIG. 5 illustrates a high level logic flowchart of a process and program for managing an API-independent request for a specific API service by a message queuing application.

FIG. 5 illustrates a high level logic flowchart of a process and program for managing an API-independent request for a specific API service by a message queuing application. In the example, the process starts at block 500 and thereafter proceeds to block 502. Block 502 illustrates a determination whether a message queuing application requires a specific API service. If a message queuing application requires a specific API service, then the process passes to block 504. Block 504 illustrates building a generic API request message based on the API request definitions for a generic API interface. Next, block 506 illustrates placing the generic API request message on an API request queue in the message queuing network listened to by an API bridge service. Thereafter, block 508 illustrates calling a message queue API to request to listen for a response message on an API response queue in the message queuing network or to identify a listener or callback routine for the queue manager to call when a new message is available on the API response queue, and the process ends.

Figure 6:
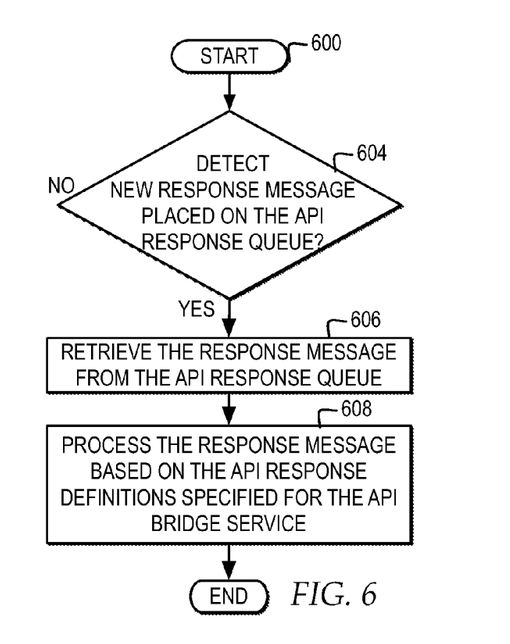
FIG. 6 illustrates a high level logic flowchart of a process and program for managing a generic API response providing specific API services to a message queuing application.

FIG. 6 illustrates a high level logic flowchart of a process and program for managing a generic API response providing specific API services to a message queuing application. In the example, the process starts at block 600 and thereafter proceeds to block 604. Block 604 illustrates a determination whether the message queuing application detects a new response message placed in the API response queue. If the message queuing application detects a new response message placed in the API response queue, then the process passes to block 606. Block 606 illustrates retrieving the response message from the API message queue. Next, block 608 depicts processing the response message based on the API response definitions specified for the API bridge service, and the process ends. In one example, the response message may include API specific services, processed by the message queuing application. In another example, the response may include an error message, and the message queuing application handles the error.

Figure 7:
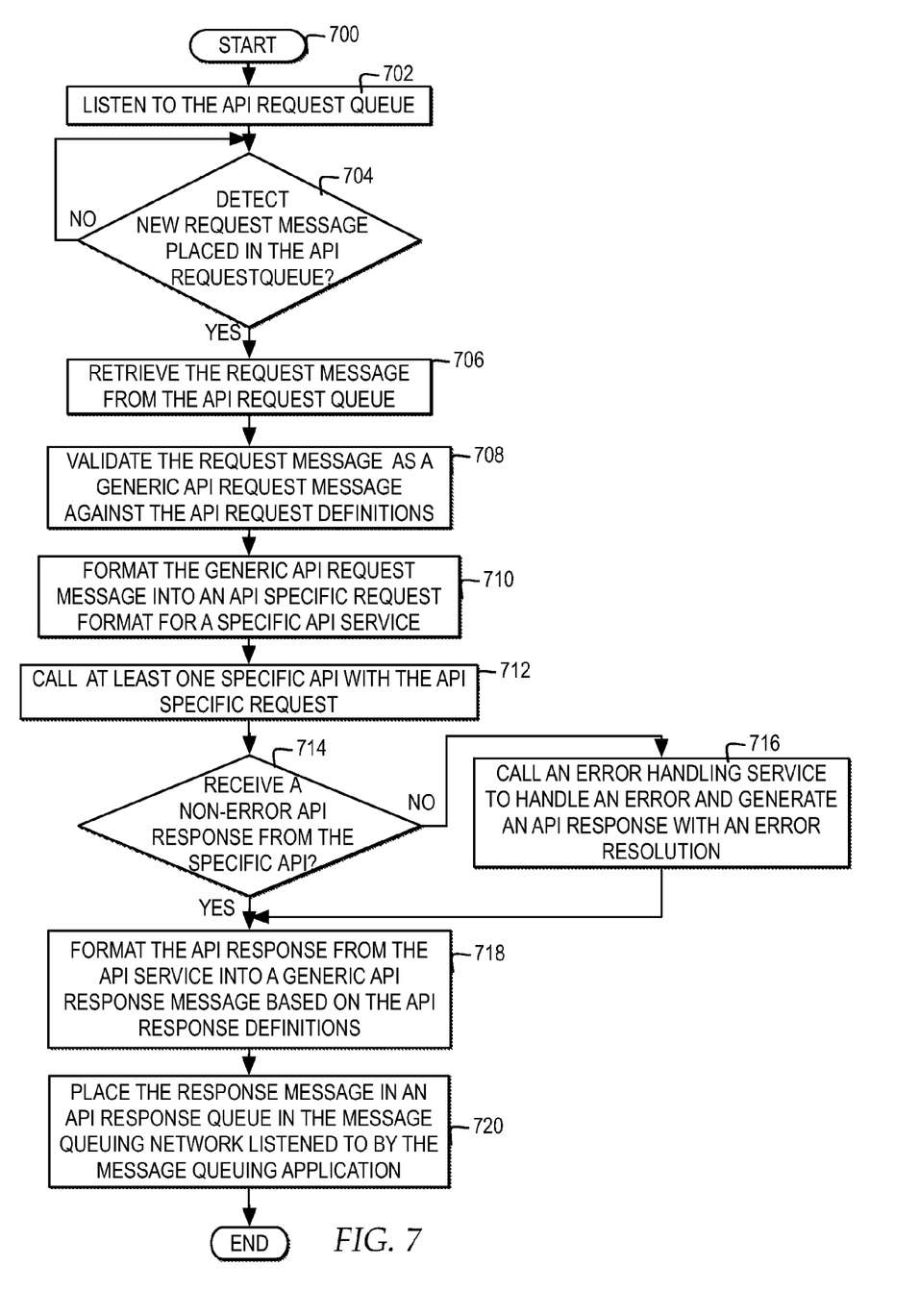
FIG. 7 illustrates a high level logic flowchart of a process and program for managing request messages by a API bridge service of a generic API interface.

FIG. 7 illustrates a high level logic flowchart of a process and program for managing request messages by a API bridge service of a generic API interface. In the example, the process starts at block 700 and thereafter proceeds to block 702. Block 702 illustrates the API bridge service listening to an API request queue. Next, block 704 illustrates a determination whether the API bridge service detects a new request message placed in the API request queue. When the API bridge service detects a new request message placed in the API request queue, the process passes to block 706. Block 706 illustrates retrieving the request message from the request queue. Next, block 708 illustrates validating the request message is a generic API request message against the API request definitions. Thereafter, block 710 illustrates formatting the generic API request message into an API specific request format for a specific API service. Next, block 712 depicts calling at least one specific API with the API specific request, to invoke a specific API. Thereafter, block 714 illustrates a determination whether the API bridge service detects a non-error API response from the specific API.

At block 714, if the API bridge service receives an error API response or does not receive any response from the called specific API within a set period of time, the process passes to block 716. Block 716 illustrates calling an error handling service to handle an error and generate an API response with an error resolution, and the process passes to block 718.

In addition, at block 714, if the API bridge service detects a non-error API response from the specific API, then the process passes to block 718. Block 718 illustrates formatting the API response from the API service into a generic API response message based on the API response definitions. Next, block 720 illustrates placing the generic API response message on an API response queue in the message queuing network listened to by the message queuing application, and the process ends. In one example, the API bridge service may call a queue manager when performing one or more of the steps of blocks 702, 704, 706, and 720.

Figure 8:
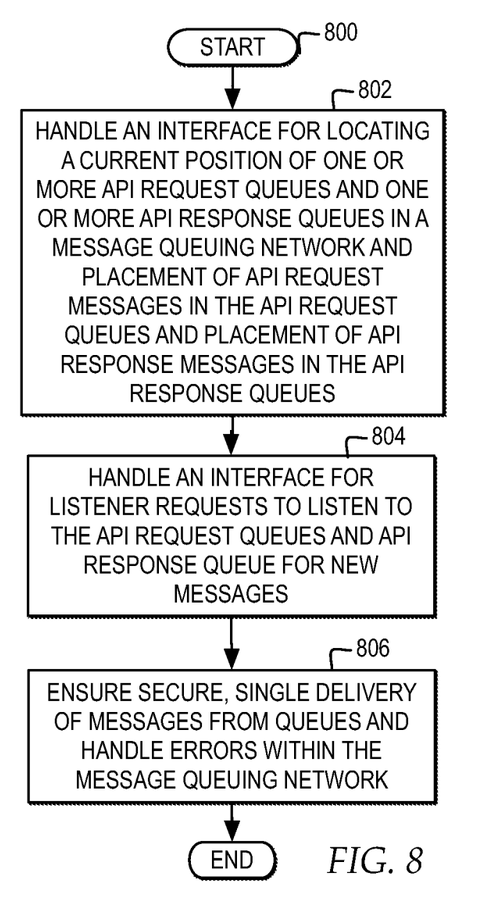
FIG. 8 illustrates a high level logic flowchart of a process and program for managing a queue manager of a message queuing network.

FIG. 8 illustrates a high level logic flowchart of a process and program for managing a queue manager of a message queuing network. In the example, the process starts at block 800 and thereafter proceeds to block 802. Block 802 illustrates handling an interface for locating of a current position of one or more API request queues and one or more API response queues in a message queuing network, for placement of API request messages in the API request queues, for and placement of API response messages in the API response queues. Next, block 804 illustrates handling an interface for listener requests to listen to the API request queues and API response queues for new messages. Thereafter, block 806 illustrates ensuring the secure, single delivery of messages from queues and handling errors within the message queuing network, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for a message queuing application to access a specific application programming interface (API) service, comprising:
   responsive to an API bridge service detecting a request message placed in a request queue of a message queuing network by a message queuing application, retrieving, by the API bridge service, the request message from the request queue, wherein the request message comprises a generic API message request, wherein the generic API message request comprises an API service request in a message queue format independent of any specific API specification;
   formatting, by the API bridge service, the generic API message request in the request message into a particular API call for at least one specific API;
   calling, by the API bridge service, the at least one specific API with the particular API call;
   responsive to the API bridge service receiving at least one API specific response from the at least one specific API, formatting, by the API bridge service, the at least one API specific response into a response message comprising a generic API response; and
   placing, by the API bridge service, the response message in a response queue of the message queuing network, wherein the message queuing application listens to the response queue for the response message and retrieves the response message to receive a specific API service from the at least one specific API without calling the at least one specific API.

2. The method of claim 1, wherein responsive to an API bridge service detecting a request message placed in a request queue of a message queuing network by a message queuing application, retrieving, by the API bridge service, the request message from the request queue, wherein the request message comprises a generic API message request further comprises:
   listening, by the API bridge service, to the request queue for the request message placed in the request queue by the message queuing application, wherein the generic API message request of the request message comprises a structured data message specified by API request definitions for the API bridge service, wherein the API request definitions specify a format independent of any particular API from among a plurality of APIs callable by the API bridge service, wherein the structured data message comprises a structured data message format comprising an extensible markup cage (XML) format.

3. The method of claim 1, wherein responsive to an API bridge service detecting a request message placed in a request queue of a message queuing network by a message queuing application, retrieving, by the API bridge service, the request message from the request queue, wherein the request message comprises a generic API message request further comprises:
   listening, by the API bridge service, to the request queue for the request message placed in the request queue by the message queuing application, wherein the generic API message request of the request message is not a call to invoke a specific API from among a plurality of APIs callable by the API bridge service.

4. The method of claim 1, further comprising:
   listening, by the API bridge service, to the request queue for the request message placed in the request queue by calling a message queue API of the message queuing network.

5. The method of claim 1, further comprising:
   listening, by the message queuing application, to the response queue asynchronously from placement, by the message queuing application, of the request message in the request queue; and
   responsive to the message queuing application detecting the response message placed in the response queue, retrieving, by the message queuing application, the response message from the response queue.

6. The method of claim 1, further comprising:
   responsive to the message queuing application requiring the specific API service, building, by the message queuing application, the request message with the generic API message request for the specific API service according to at least one API request definition specified by the API bridge service;
   requesting, by the message queuing application, placement of the request message in the API request queue by calling a message queue API of the message queuing network;
   calling, by the message queuing application, the message queue API of the message queuing network to open a listener on the response queue;
   responsive to the listener detecting the response message on the response queue, retrieving, by the message queuing application, the response message from the response queue for the message queuing application; and
   processing, by the message queuing application, the response message.

7. A system for a message queuing application to access a specific application programming interface (API) service, comprising:
   an API bridge service, comprising at least one processor and a memory, responsive to an API bridge service detecting a request message placed in a request queue of a message queuing network by a message queuing application, operative to retrieve, the request message from the request queue, wherein the request message comprises a generic API message request, wherein the generic API message request comprises an API service request in a message queue format independent of any specific API specification;
   the API bridge service operative to format the generic API message request in the request message into a particular API call for at least one specific API;
   the API bridge service operative to call the at least one specific API with the particular API call;
   the API bridge service, responsive to the API bridge service receiving at least one API specific response from at least one specific API, operative to translate the at least one API specific response into a response message comprising a generic API response; and
   the API bridge service operative to place the response message in a response queue of the message queuing network, wherein the message queuing application listens to the response queue for the response message and retrieves the response message to receive a specific API service from the at least one specific API without calling the at least one specific API.

8. The system of claim 7, wherein the API bridge service, responsive to an API bridge service detecting a request message placed in a request queue of a message queuing network by a message queuing application, operative to retrieve the request message from the request queue, wherein the request message comprises a generic API message request further comprises:

the API bridge service operative to listen to the request queue for the request message placed in the request queue by the message queuing application, wherein the generic API message request of the request message comprises a structured data message specified by API request definitions for the API bridge service, wherein the API request definitions specify a format independent of any particular API from among a plurality of APIs callable by the API bridge service, wherein the structured data message comprises a structured data message format comprising an extensible markup cage (XML) format.

9. The system of claim 7, wherein the API bridge service, responsive to detecting a request message placed in a request queue of a message queuing network by a message queuing application, operative to retrieve the request message from the request queue, wherein the request message comprises a generic API message request further comprises:

the API bridge service operative to listen to the request queue for the request message placed in the request queue by the message queuing application, wherein the generic API message request of the request message is not a call to invoke a specific API from among a plurality of APIs callable by the API bridge service.

10. The system of claim 7, further comprising:
the API bridge service operative to listen to the request queue for the request message placed in the request queue by calling a message queue API of the message queuing network.

11. The system of claim 7, further comprising:
the message queuing application operative to listen to the response queue asynchronously from placement, by the message queuing application, of the request message in the request queue; and
the message queuing application, responsive to detecting the response message placed in the response queue, operative to retrieve the response message from the response queue.

12. The system of claim 7, further comprising:
the message queuing application, responsive to the message queuing application requiring the specific API service, operative to build the request message with the generic API message request for the specific API service according to at least one API request definition specified by the API bridge service;
the message queuing application operative to request placement of the request message in the API request queue by calling a message queue API of the message queuing network;
the message queuing application operative to call the message queue API of the message queuing network to open a listener on the response queue;
the message queuing application, responsive to the listener detecting the response message on the response queue, operative to retrieve the response message from the response queue for the message queuing application; and
the message queuing application operative to process the response message.

13. A computer program product for a message queuing application to access a specific application programming interface (API) service, comprising:

one or more computer-readable, tangible storage devices;
program instructions, stored on at least one of the one or more storage devices, responsive to an API bridge service detecting a request message placed in a request queue of a message queuing network by a message queuing application, to retrieve, by the API bridge service, the request message from the request queue, wherein the request message comprises a generic API message request, wherein the generic API message request comprises an API service request in a message queue format independent of any specific API specification;
program instructions, stored on at least one of the one or more storage devices to format, by the API bridge service, the generic API message request in the request message into a particular API call for at least one specific API;
program instructions, stored on at least one of the one or more storage device to call, by the API bridge service, the at least one specific API with the particular API call;
program instructions, stored on at least one of the one or more storage devices, responsive to the API bridge service receiving at least one API specific response from the at least one specific API, to translate, by the API bridge service, the at least one API specific response into a response message comprising a generic API response; and
program instructions, stored on at least one of the one or more storage devices, to place, by the API bridge service, the response message in a response queue of the message queuing network, wherein the message queuing application listens to the response queue for the response message and retrieves the response message to receive a specific API service from the at least one specific API without calling the at least one specific API.

14. The computer program product of claim 13, further comprising:
program instructions, stored on at least one of the one or more storage devices, to listen, by the API bridge service, to the request queue for the request message placed in the request queue by the message queuing application, wherein the generic API message request of the request message comprises a structured data message specified by API request definitions for the API bridge service, wherein the API request definitions specify a format independent of any particular API from among a plurality of APIs callable by the API bridge service, wherein the structured data message comprises a structured data message format comprising an extensible markup language (XML) format.

15. The computer program product of claim 13, further comprising:
program instructions, stored on at least one of the one or more storage devices, to listen, by the API bridge service, to the request queue for the request message placed in the request queue by the message queuing application, wherein the generic API message request of the request message is not a call to invoke a specific API from among a plurality of APIs callable by the API bridge service.

16. The computer program product of claim 15, further comprising:
program instructions, stored on at least one of the one or more storage devices, to listen, by the API bridge service, to the request queue for the request message placed in the request queue by calling a message queue API of the message queuing network.

17. The computer program product of claim 15, further comprising:
- program instructions, stored on at least one of the one or more storage devices, to listen, by the message queuing application, to the response queue asynchronously from placement, by the message queuing application, of the request message in the request queue; and
- program instructions, stored on at least one of the one or more storage devices, responsive to the message queuing application detecting the response message placed in the response queue, to retrieve, by the message queuing application, the response message from the response queue.

18. The computer program product of claim 15, further comprising:
- program instructions, stored on at least one of the one or more storage devices, responsive to the message queuing application requiring the specific API service, to build, by the message queuing application, the request message with the generic API message request for the specific API service according to at least one API request definition specified by the API bridge service;
- program instructions, stored on at least one of the one or more storage devices, to request, by the message queuing application, placement of the request message in the API request queue by calling a message queue API of the message queuing network;
- program instructions, stored on at least one of the one or more storage devices, to call, by the message queuing application, the message queue API of the message queuing network to open a listener on the response queue;
- program instructions, stored on at least one of the one or more storage devices, responsive to the listener detecting the response message on the response queue, to retrieve, by the message queuing application, the response message from the response queue for the message queuing application; and
- program instructions, stored on at least one of the one or more storage devices, to process, by the message queuing application, the response message.

19. A method for a message queuing application accessing a specific application programming interface (API) service, comprising:
- building, by a message queuing application, a request for a specific API service from among a plurality of API services in a generic API message request validated using API request definitions available to the message queuing application and available to an API bridge service, wherein the generic API message request comprises an API service request in a message queue format, wherein the generic API message request of the request message comprises a structured data message specified by the API request definitions for the API bridge service, wherein the API request definitions specify a message format independent of a protocol specified for any articular API call for the plurality of API services, wherein the structured data message comprises a structured data message format comprising an extensible markup (XML) format;
- placing by the message queuing application, the generic API message request on a request message queue of a message queuing network configured to provide a generic API interface for accessing the plurality of API services;
- listening, by an API bridge service of the generic API interface, to the message queue;
- responsive to the API bridge service detecting the generic API message request in the message queue, retrieving, by the API bridge service, the generic API message request from the message queue, formatting the generic API message request from the API service request in the message queue format into a call to a specific API from among the plurality of API services, calling the specific API, formatting a result returned by the specific API from the particular format protocols specified for the specific API into a generic API response message validated using API response definitions available to the message queuing application and available to the API bridge service, wherein the generic API response comprises an API server response in a message queue format, and placing the generic API response message in a response message queue of the message queuing network of the generic API interface;
- retrieving, by the message queuing application, the generic API response message from the response message queue; and
- processing the generic API response message, wherein the processed response message provides the message queuing application with the specific API service.

* * * * *